No. 892,306. PATENTED JUNE 30, 1908.
J. H. RAND.
PUNCTURE CLOSER.
APPLICATION FILED OCT. 21, 1907.
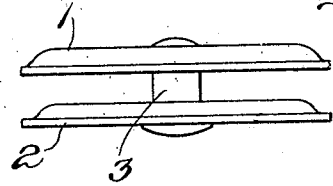
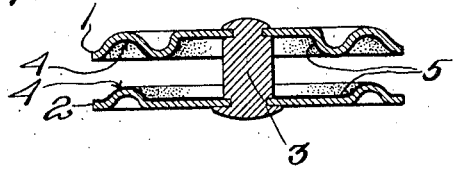
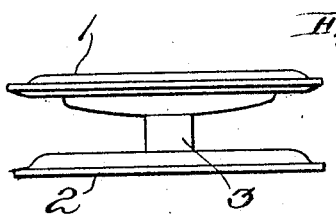
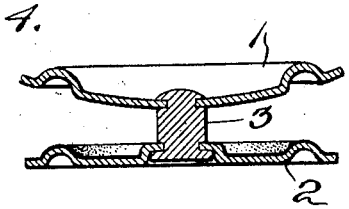
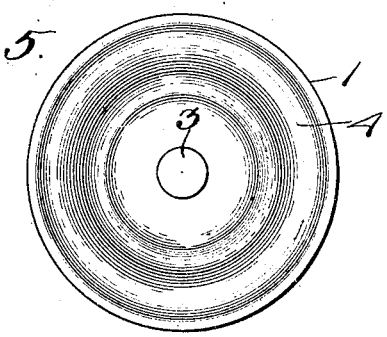
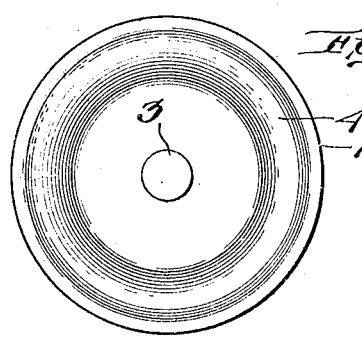
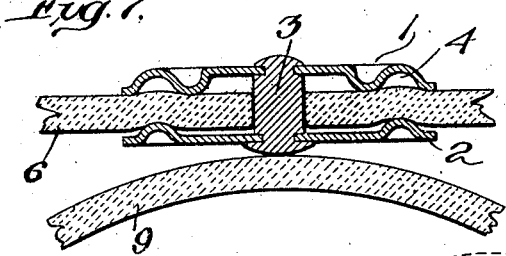
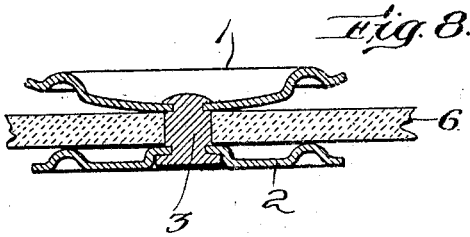
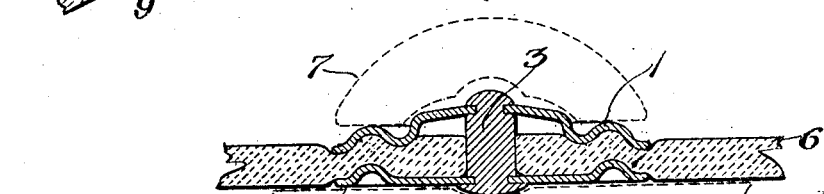
Witnesses:
J. T. Brennan
C. J. Wadbery
Inventor:
James H. Rand,
by Robert Cushman,
Atty

UNITED STATES PATENT OFFICE.

JAMES H. RAND, OF NEWTON, MASSACHUSETTS.

PUNCTURE-CLOSER.

No. 892,306.

Specification of Letters Patent.

Patented June 30, 1908.

Application filed October 21, 1907. Serial No. 398,372.

*To all whom it may concern:*

Be it known that I, JAMES H. RAND, a citizen of the United States, and resident of Newton, in the county of Middlesex and State of Massachusetts, have invented new and useful Improvements in Puncture - Closers, of which the following is a specification.

My invention relates to puncture closers designed for closing or repairing holes, cuts or punctures in tubing, and particularly for repairing or closing punctures in the inner tubes of pneumatic tires.

In the accompanying drawings which illustrate certain embodiments of my invention,—Figure 1 is a side elevation of a puncture closer embodying my invention; Fig. 2 is a vertical section through the center of Fig. 1; Fig. 3 is a side elevation of another form of puncture closer embodying my invention;
Fig. 4 is a vertical section through the center of Fig. 3; Fig. 5 is a plan view of the puncture closer illustrated in Fig. 1; Fig. 6 is a plan view of the puncture closer illustrated in Fig. 3; Fig. 7 is a sectional view showing the puncture closer illustrated in Figs. 1 and 2 inserted in the hole of a tire before the head plates are pinched and clamped together or set; Fig. 8 is a sectional view showing the puncture closer of the form illustrated in Figs. 3 and 4 inserted in the hole of a tire before the head plates are pinched and clamped together or set; and Fig. 9 is a sectional view showing the position assumed by the form of puncture closer shown in Fig. 7 when finally clamped or set in the tire.

The invention comprises essentially a pair of opposed head plates rigidly connected together by a stiff post, the plates adapted to be bent or flexed toward one another positively and firmly to grip between their faces the material of the tubing about the puncture or hole to be closed to effect an air tight seal. In accomplishing this it is sufficient if one of the two head plates is bent while the other remains flat, although satisfactory results are obtained by bending both of the head plates toward one another.

Other features of the invention will be hereinafter set forth and more particularly pointed out in the claims.

Referring to the drawings, 1 and 2 represent a pair of head plates which, as herein shown, are circular in form though other shapes may be employed without departing from the spirit of the invention. The head plates 1 and 2 are rigidly and permanently connected by a central stiff non-contractile post 3.

In the form of device shown in Figs. 1 and 2 both of the head plates, before being clamped and set in the tubing as hereinafter described, are substantially flat and parallel throughout their general direction and leaving out of consideration the corrugations.
Upon the opposed faces of these head plates are annular corrugations 4, 4, the parts projecting from one surface registering with recesses in the other surface. Preferably, the opposed or gripping surfaces of said plates are coated or lined with rubber as shown at 5 or with some similar compressible material impervious to air.

In the form of device shown in Figs. 1 and 2 the central post 3 is preferably made of such height that the space between the opposed or gripping surfaces of the head plates shall be slightly greater than the thickness of the tubing to which the device is to be applied. This space could conceivably be made the same as the thickness of the tubing, but in order to facilitate the insertion of the device in the hole to be closed I preferably make the space a little greater than the thickness of the tubing.

In the form of device shown in Figs. 3 and 4 the construction is the same as above set forth with the exception of one of the head plates, which, for convenience, may be termed the upper plate 1, and which instead of being substantially flat in general direction is slightly dished, or of concavo convex form as shown. By the use of this construction the post 3 may be made shorter and need not exceed in height the thickness of the tubing to which the article is to be applied, thus providing a flatter puncture closer when the article is clamped and set. This dished form of plate also facilitates the insertion of the device in the puncture hole in the manner presently to be described.
Complementary corrugations and a coating of rubber or the like may be provided upon the opposed clamping surfaces as already described.

The operation of the device is as follows:
The tubing 6, having the puncture or hole to be sealed, is made of elastic material. The hole or puncture is stretched, first having been cut out clean, if desired, by some suitable form of punch, and the lower head plate 2 is passed through the stretched opening and the tubing allowed to spring back about the post 3. Figs. 7 and 8 show the two forms of puncture closers above described inserted in the hole of a tube ready to be set. A pair of pincers is then applied, having preferably a flat surfaced lower jaw and a concave surfaced upper jaw. A form of jaws suitable for the purpose is shown in dotted lines in Fig. 9 at 7 and 8. The tubing is collapsed as shown at 9 in Figs. 7 and 9, so that the lower plate 2 abuts substantially against the flat lower jaw of the pincers through only the thickness of the material of tubing 9. Pressure is then applied to the pincers and the concave upper jaw 7 of the pincers bends the periphery of the upper head plate 1 toward the lower head plate 2, the general curvature of the upper plate conforming with the concave surface of the upper jaw of the pincers as shown in Fig. 9. This causes the opposed plates to be pinched toward one another clamping and firmly binding and sealing the material of the tubing about the puncture between the opposed faces of the plates. The seal is perfected and all possibility of the leakage of air avoided by the corrugations in the opposed surfaces of the head plates which indent and compress the material of the tubing, and by the coating of impervious compressible material 5, such as rubber, on the opposed faces of the head plates.

I claim:

1. A puncture closer comprising a pair of opposed head plates rigidly connected by a non-contractile post, one at least of said plates adapted to be flexed into positive gripping relation with its opposed plate.

2. A puncture closer comprising a pair of opposed head plates rigidly connected by a central non-contractile post, one at least of said plates adapted to be peripherally flexed into positive gripping relation with its opposed plate.

3. A puncture closer comprising a pair of opposed head plates rigidly connected by a non-contractile post, one at least of said plates being dished and adapted to be peripherally flexed into positive gripping relation with its opposed plate.

4. A puncture closer comprising a pair of opposed head plates rigidly connected by a non-contractile post, one of said plates being substantially flat, and the other being dished and adapted to be peripherally flexed into positive gripping relation with said flat plate.

5. A puncture closer comprising a pair of opposed head plates rigidly connected by a non-retractile post, one at least of said plates adapted to be flexed into positive gripping relation with its opposed plate, and one of said plates having an annular channel and the other having an annular rib registering with said channel when the plates are pinched together into gripping relation.

6. A puncture closer comprising a pair of opposed, circular head plates rigidly connected by a central non-contractile post, one of said plates being flat, and the other being dished and adapted to be peripherally flexed into positive gripping relation with the flat plate, and complementary annular corrugations on the opposed faces of said plates.

7. A puncture closer comprising a pair of opposed head plates rigidly connected by a non-contractile post, one at least of said plates adapted to be flexed into positive gripping relation with its opposed plate, the opposed gripping surfaces of said plates being coated with a compressible material impervious to air.

Signed by me at Boston, Massachusetts, this tenth day of October, 1907.

JAMES H. RAND.

Witnesses:
CHARLES D. WOODBERRY,
ROBERT CUSHMAN.